United States Patent
Kushihashi et al.

[11] B 3,925,050
[45] Dec. 9, 1975

[54] PROCESS AND APPARATUS FOR PRODUCING GLASS HAVING METAL OXIDE COATING

[75] Inventors: Akira Kushihashi; Yutaka Fuziwara, both of Ichihara; Naotomo Akashi, Maizuru, all of Japan

[73] Assignee: Nippon Sheet Glass Co., Ltd., Osaka, Japan

[22] Filed: Feb. 1, 1974

[21] Appl. No.: 438,706

[44] Published under the Trial Voluntary Protest Program on January 28, 1975 as document no. B 438,706.

[52] U.S. Cl. ............... 65/60; 65/181; 117/167; 117/252; 117/253; 118/312; 118/326
[51] Int. Cl.² ........................................ C03C 17/00
[58] Field of Search ........... 65/60, 181; 117/93.41; 118/312, 326

[56] References Cited
UNITED STATES PATENTS

| | | | |
|---|---|---|---|
| 3,516,811 | 6/1970 | Gatchet et al. | 65/60 |
| 3,573,888 | 4/1971 | Bogart | 65/60 X |
| 3,676,097 | 7/1972 | Plumat et al. | 65/60 X |
| 3,681,042 | 8/1972 | Edwards et al. | 65/60 X |
| 3,689,304 | 9/1972 | Bamford | 65/60 X |

Primary Examiner—Arthur D. Kellogg
Attorney, Agent, or Firm—Wenderoth, Lind & Ponack

[57] ABSTRACT

A process and an apparatus are provided for disposing of the exhaust gases which are generated in a step of forming a metal oxide coating on the surface of a sheet-like glass. It is well known that when a solution of a metal compound is sprayed onto the surface of the sheet glass at a high temperature, a metal oxide coating is formed on the glass surface and at the same time, large quantities of exhaust gases are generated by the heat decomposition of the metal compound, and that many of such exhaust gases are noxious. In accordance with this invention, the exhaust gases are conducted to the outside and fed into a glass melting furnace held at a high temperature, where the noxious substances are completely decomposed and rendered non-noxious. The invention can be performed at low installation costs, and no running cost is required. Since the present invention makes it possible to release the treated gases into the atmosphere from a chimney of the glass melting furnace, it is excellent as a measure for preventing pollution.

9 Claims, 6 Drawing Figures

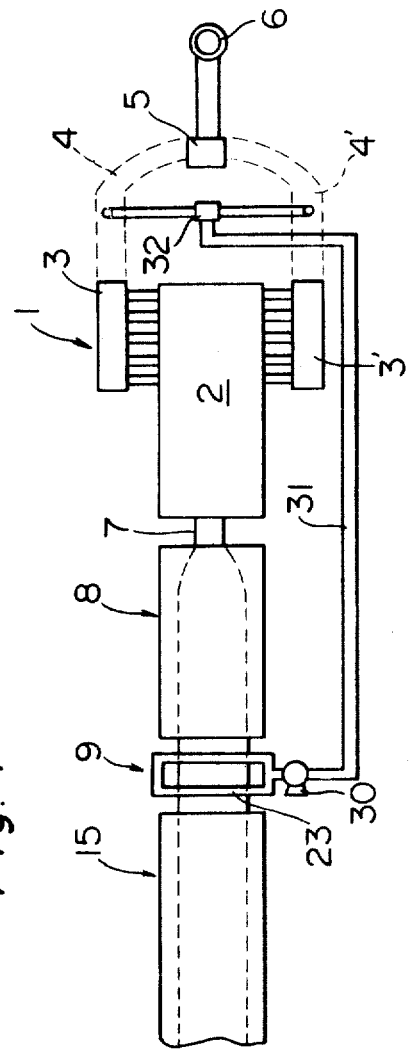
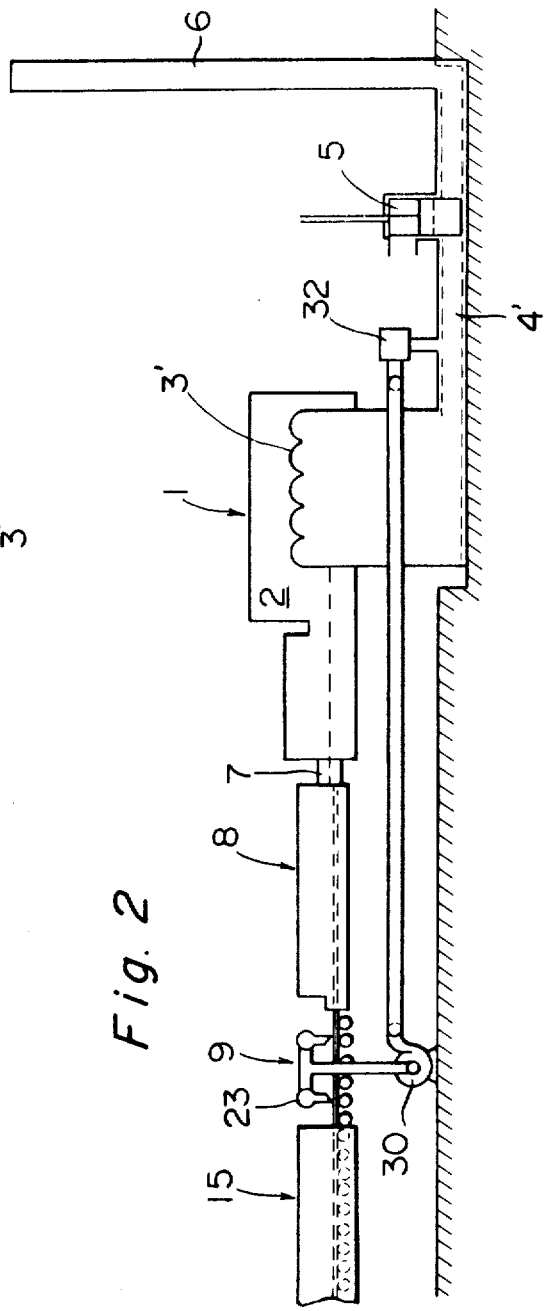
Fig. 1
Fig. 2

PROCESS AND APPARATUS FOR PRODUCING GLASS HAVING METAL OXIDE COATING

This invention relates to a method and an apparatus for treating noxious gases which are generated when forming a metal oxide coating on a sheet glass.

The "sheet glass" denotes glass sheets cut to a desired size and ribbon glasses.

Methods have been known previously to impart new properties to sheet glass or improve its mechanical properties by coating a metal oxide on its surface. For example, by coating the surface of sheet glass with a thin film of titanium oxide or tin oxide, the scratch resistance of the surface is improved. Or by coating a mixture of tin oxide with indium oxide or antimony oxide on the surface of sheet glass, electric conductivity is imparted to the surface, so that when the glass is heated by passing electric current, cloud or freezing which may obstruct the visual field can be prevented.

Especially when sheet glass is coated with at least one metal oxide such as cobalt oxide, chromium oxide, iron oxide or tin oxide, the optical properties of the glass surface can be improved by dint of the refractive index and absorption coefficient of the metal oxide, and the surface reflectance of the sheet glass can be increased by 3 to 6 times. Glass sheet of this kind, when used as windowpane of buildings or vehicles, permits a bright outside view but prevents the inside of the building or vehicle from being seen externally.

Furthermore, such a glass properly shields the radiation of solar energy by the reflection and absorption of it, and serves to alleviate the necessity for air-conditioning of buildings.

Known methods for producing glass sheets having metal oxide coatings include, for example, a vacuum evaporation method, a reactive spattering method, and a heat-decomposition method.

As a procedure for applying the heat decomposition method to a sheet glass cut to a certain size, there is known a method which comprises spraying a metal compound capable of being heat decomposed to a metal oxide, or its solution to a glass sheet suspended perpendicularly and heated by means of a spray gun, thereby to form a coating of the metal oxide, or a method which comprises immersing a glass sheet in a metal compound capable of being heat decomposed to a metal oxide, or its solution, withdrawing it, and heating the glass sheet thereby to form a metal oxide coating on both surfaces of the glass sheet. One known apparatus for applying the above heat decomposition method to a continuous ribbon glass comprises a spray gun running or oscillating in a direction across the advancing direction of a ribbon-like glass formed from molten glass and being in transit, means for feeding a solution of a metal compound capable of being decomposed to a metal oxide by heating and jetting out said solution from said spray gun, and discharge means with an exhaust pipe for sucking and removing the exhaust gas of the sprayed solution from the vicinity of the ribbon-like glass, through a suction opening positioned near the surface of the ribbon-like glass to which the solution is sprayed and along the path of running or oscillating of said spray gun.

It is difficult to decompose the metal compound and the solvent for it completely in the above apparatus, and especially a greater part of the solvent is sucked and removed by the discharge means and released into the atmosphere as a gaseous phase. Since such a solvent and organic metal compound or its intermediate decomposition products are usually noxious to the human body, they are likely to cause environmental pollution and also adversely affect the health of the nearby residents. Especially when benzene is used as the above solvent, it is not permissible, from the standpoint of preventing pollution, to release it into the air without treatment.

Known methods for treating such noxious exhaust gases include, for example, an adsorption method in which the gases are diffused into the micropores of activated carbon, a catalytic oxidation method comprising passing the gases through a noble metal catalyst layer thereby oxidatively decomposing the gases, a washing method in which the gases are passed through a washing column using a solvent, and a high temperature combustion method which involves using the exhaust gases as a burning air.

In the high temperature combustion method, a furnace or burner required for combustion is provided, and attempt is made to increase the decomposition efficiency by prolonging the time of passing the exhaust gases through the furnace, which, however, is difficult in general.

It is an object of this invention to provide a process and an apparatus for producing a glass sheet having a metal oxide coating, wherein the exhaust gases can be completely disposed of without using any particular furnace or burner.

In a first aspect of this invention, there is provided a process for producing glass containing a metal oxide coating, such as sheet glass, which comprises a step of coating a high temperature glass, for example, a sheet-like glass, with a metal compound capable of being heat decomposed to a metal oxide, or its solution, a step of sucking and removing exhaust gases generated in the coating step, from the vicinity of the surface of the glass, and a step of feeding the removed exhaust gases into a regenerator chamber of a glass melting furnace and then releasing them into the atmosphere.

According to a second aspect of this invention, there is provided a process for producing a ribbon-like glass having a metal oxide coating, which comprises a step of melting glass in a melting furnace, a step of forming the molten glass into a ribbon-like glass, a step of spray-coating a metal compound heat decomposable to a metal oxide or its solution on the glass surface while the ribbon-like glass is at a high temperature, a step of removing the exhaust gases generated in the coating step from the vicinity of the surface of the ribbon-like glass, a step of feeding said gases into a regenerator chamber of the glass melting furnace, and a step of advancing the ribbon-like glass having the metal oxide coating formed thereon, within an annealing lehr.

According to a third aspect of this invention, there is provided an apparatus for producing a ribbon-like glass having a metal oxide coating, comprising a glass melting furnace including a regenerator chamber, a forming device for forming the molten glass into a ribbon-like glass, means for transferring the formed ribbon-like glass, an annealing lehr covering an annealing temperature range for the ribbon-like glass, a spray gun running or oscillating toward the surface of the ribbon-like glass and in its widthwise direction at a position where the temperature of the ribbon-like glass is high, means for feeding into said spray gun a metal compound capable of being heat decomposed to a metal oxide or a solution of said metal compound, and allowing said metal compound or its solution to jet out from the spray gun, exhaust means for sucking and removing exhaust gases of the sprayed metal compound or its solution from the vicinity of the surface of the ribbon-like glass through a pair of suction openings provided on both sides of the path of running or oscillating of the spray gun, and a conduit for conducting the exhaust gases so sucked into a regenerator chamber of the glass melting furnace.

The ribbon-like glass to be used in this invention can be produced by the float process, the Colburn process, the rolled process, the Fourcault process or Pittsburgh process.

According to this invention, the exhaust gases are first conducted to the regenerator chamber of the glass melting tank, then to the molten glass tank, and then released out into the atmosphere through a chimney. The exhaust gases conducted to the regenerator chamber are at a relatively low temperature at its inlet, but are preheated therein. While organic substances contained in the exhaust gases are decomposed, the exhaust gases are fed into the molten tank in the glass melting furnace, where the air occupying a greater portion of the exhaust gases acts as a gas for burning the fuel, and the undecomposed organic substances are completely decomposed and released from the chimney through a heat storage chamber on the outlet side. Thus, the exhaust gases do not affect the temperature or pressure of the glass melting furnace.

Examples of the metal compounds that can be decomposed to metal oxides by heat decomposition are compounds of metals such as cobalt, chromium, iron, tin, titanium, calcium and magnesium. For example, there can be used acetates or acetylacetonates of these metals, or fatty acid esters of these metals such as dimethyl tin dipropionate or a titanium ester. These are used either alone or in combination, and may be used in the form of a solution. Where it is desired to obtain an electrically conductive metal oxide coating, organic metal compounds of tin, indium, or antimony are used as the metal compound. These metal compounds are soluble in organic solvents such as alcohols, benzene, toluene, xylene, chloroform, methylene chloride, or pyridine.

When a solution of the metal compound is coated on a high temperature glass sheet by means of a spray gun, a part of the metal compound adheres thereto and is decomposed to a metal oxide which is adhered to the glass sheet. The remainder of the metal compound (namely, the metal compound, its decomposition products and the solvent) is sucked and removed from the vicinity of the surface of the sheet glass as exhaust gases through the suction openings of the exhaust means. The sucked exhaust gases are fed into the regenerator chamber, as described above.

The regenerator chamber into which the exhaust gases are to be introduced, may be a regenerator chamber of a melting furnace for melting a glass batch for forming the sheet glass to be coated with a metal oxide. When another glass melting furnace is provided in the adjoining position, the exhaust gases may also be introduced in a regenerator chamber of this glass melting furnace.

Preferably, the present invention is applied to the continuous coating of a ribbon-like glass immediately after formation. It can also be applied to the intermittent coating of glass sheets cut to the desired size.

Preferably, according to this invention, the exhaust gases are introduced into a regenerator chamber on the air-sucking side of the glass melting furnace, and passed through the channel, and then released into the atmosphere through a regenerator chamber on the air outlet side via the chimney.

One embodiment of this invention will be described by reference to the accompanying drawings in which:

FIG. 1 is a plan view of the apparatus of this invention;

FIG. 2 is a side elevation of the apparatus shown in FIG. 1;

Figure 3:
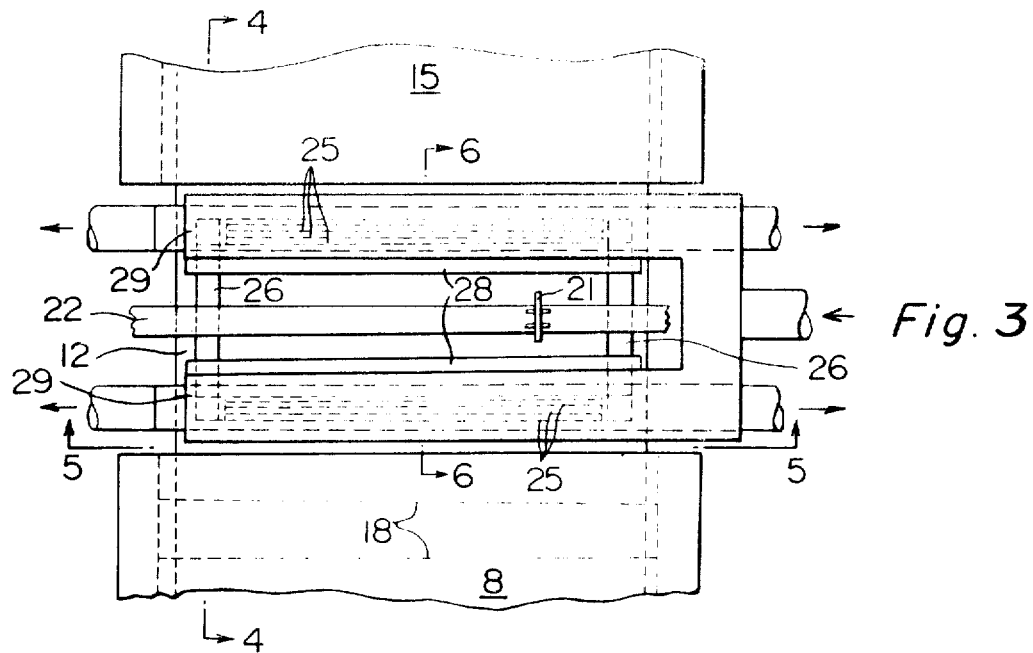
FIG. 3 is a plan view of the apparatus in the vicinity of spray means.

As shown in FIGS. 1 and 2, a glass melting furnace 1 consists of a glass melting tank 2, regenerator chambers 3 and 3', gas channels 4 and 4', a gas-exchanger 5 and a chimney 6. Following the glass melting tank 2, a channel 7 for feeding molten glass and a molten metal bath tank 8 are positioned. The channel 7 feeds molten glass at a certain rate to a glass forming device, that is the molten metal bath tank 8. The molten metal bath 8 includes heating and cooling means (not shown).

Figure 4:
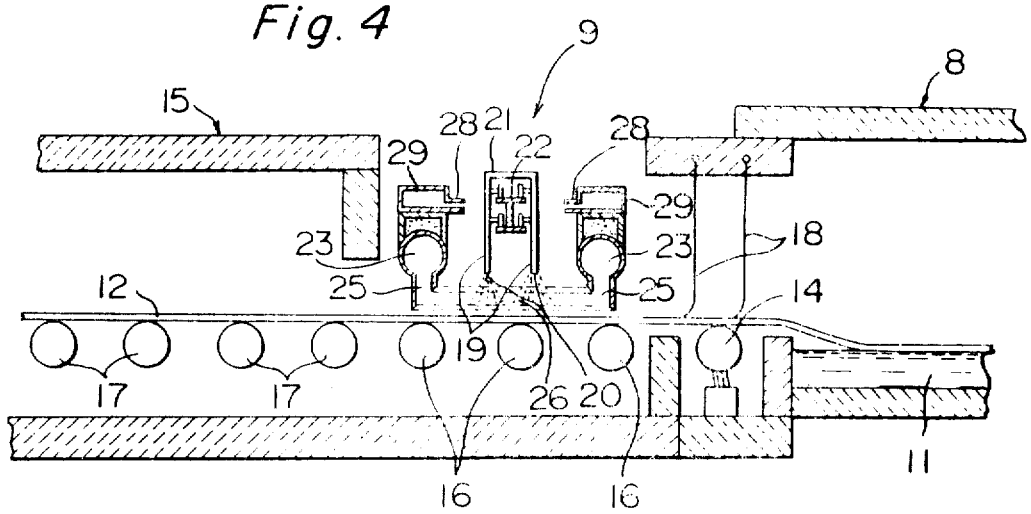
FIG. 4 is a side elevation in longitudinal section taken along the line 4—4 of FIG. 3.
Figure 5:
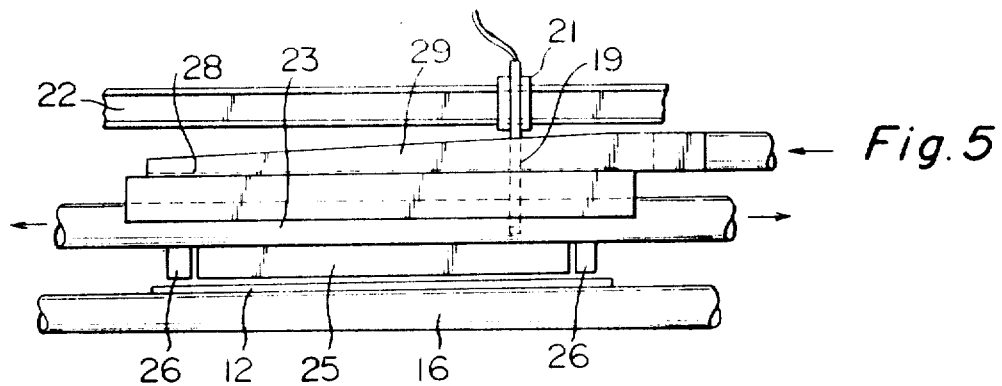
FIG. 5 is a side elevation in cross section taken along the line 5—5 of FIG. 3.

As shown in FIG. 4, a temperature gradient is provided on a ribbon-like glass 12 formed on a molten metal bath 11 within the molten metal bath tank 8 so that the temperature of the ribbon-like glass falls from about 1050°C. to about 650°C. during passage from the inlet toward the outlet of the tank 8. The ribbon-like glass 12 whose temperature has been lowered to about 650°C. is transferred by rolls 14 and 16 to an annealing lehr 15. A spraying means 9 is provided between the molten metal bath tank 8 and the annealing lehr 15. In the spray means 9, a metal oxide coating is formed on the surface of the ribbon-like glass, and how to dispose of the exhaust gases generated in the spray means 9 constitutes a major subject of the present invention.

The outline of the apparatus of this invention is shown in FIGS. 1 and 2. The exhaust gases generated at the spray means 9 are sucked by exhaust pipes 23, and conducted by an air blower 30 to a gas-exchanger 32 cooperating with the gas-exchanger 5 through a gas transferring pipe 31. Then, the exhaust gases are sucked into regenerator chamber 3 or 3' on the sucking side of the glass melting furnace 1 together with air for burning heavy oil through channel 4 or 4' by the gas-exchanger 32, and preheated there. The glass melting furnace 1 includes a heavy oil burner (not shown), and a heavy oil is burned within a glass melting tank 2. The exhaust gases which have been pre-heated during passage through the regenerator chamber and the air are used for burning heavy oils. The exhaust gases are caused to advance in either one of the channels 4 and 4' in the gas-exchanger 32. For example, if the gases pass through the channel 4, they are preheated in the regenerator chamber 3 and burned in the glass melting tank 2; and the exhaust gases after burning pass through the channel 4', and are released from the chimney 6 out into the atmosphere. It is possible to take the other route from the gas-exchanger 32 to the channel 4 and the chimney 6 through the channel 4' the regenerator chamber 3', and the glass melting tank 2.

In the above-mentioned process, the gases which have arrived at the regenerator chamber after passage through the gas transferring pipe 31 and the channel have a temperature of about 200°C. These gases are heated to more than 400°C. Accordingly, almost all organic substances contained in the exhaust gases are decomposed there. Then, the exhaust gases participate in the burning of heavy oils, and the remaining undecomposed matters are also completely decomposed by burning.

For example, analysis shows that the exhaust gases in the gas transferring pipe 31 have benzene and methanol concentrations of 850 ppm (about 0.7 %) respectively, but that the above components or intermediate products such as acrolein are not at all detected in the channel beneath the chimney 6.

In addition to these superior results, the provision of such devices scarcely affects the operation of the glass melting furnace. The only change is that the temperature of the burning exhaust gases rises by 5°C.

The apparatus of this invention is not limited to the specific embodiment shown in FIGS. 1 and 2. For example, in the above embodiment, the exhaust gases are fed into the glass melting furnace 1 through the channels 4 and 4', but it is also possible to fed them directly to the regenerate chamber 3 or 3'.

The structure of the spray means used in this invention is of any conventional type. The suitable spray means that can be used in this invention is illustrated in FIGS. 3 to 6. As shown in FIG. 4, a heat-resistant asbestos curtain 18 is suspended from the ceiling of the outlet of the molten metal bath tank 8 to shut off the atmospheric gas in the tank 8 from the outer atmosphere. The ribbon-like glass 12 is pulled up from the molten metal bath tank 8, and advances towards the annealing lehr 15. The spray means 9 is provided between the asbestos curtain 18 and the annealing lehr 15. A spray device 19 reciprocating across the ribbon-like glass 12 and blowing a liquid metal compound onto the surface of the ribbon-like glass 12 is suspended in the spray means 9. The spray device 19 consists of a pair of suspending units spaced from each other with a certain distance therebetween, and a nozzle is fitted to the lower end of each of the suspending units. The nozzles 20 face the surface of the ribbon-like glass 12 with a certain distance therebetween. The upper end of the spray device 19 is connected to a support member 21 which rides on a guide rail 22 provided substantially in parallel with the surface of the ribbon-like glass 12 at right angles to the advancing direction of the ribbon-like glass 12, and reciprocates across the ribbon-like glass along the guide rail 22.

Figure 6:
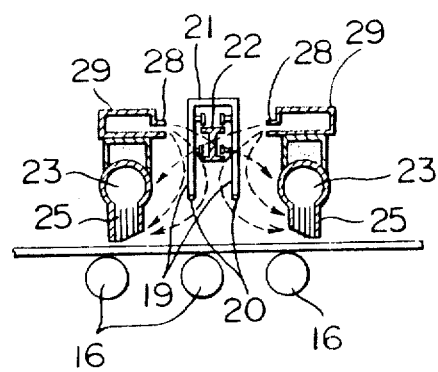
FIG. 6 is a side elevation in longitudinal section taken along the line 6—6 of FIG. 3.

A device for removing the exhaust gases generated within the spray means 9 is shown in FIGS. 3 and 6. A pair of exhaust pipes 23 spaced from each other at a certain distance are disposed on both sides of the moving path of the spray device 19, and the end of each of the exhaust pipes is connected to the same air blower 30, as shown in FIG. 1. Thus, the exhaust gases are fed into the regenerator chamber by the blower 30.

A pair of the exhaust pipes 23 include a pair of suction tubes 26 facing each other on both sides of the ribbon-like glass 12, and below the exhaust pipe 23 is disposed a suction opening 25 which faces the upper surface of the ribbon-like glass. The suction opening 25 has a slit formed by a number of suspending plates extending up to the surface of the ribbon-like glass, which slit serves to suck the exhaust gases uniformly.

In order to blow a heated gas such as air, the spray means 9 includes a pair of air ducts 29. As shown in FIGS. 3, 4, 5 and 6, the air ducts 29 are positioned above the pair of exhaust pipes 23, and each of the air ducts 29 has a blow-in opening 28 toward the spray means 9. A high temperature gas is blown from the blow-in opening 28 into the spray means 9. This contributes to the prevention of the occurrence of a local, abnormally high or low temperature region on the surface of the ribbon-like glass. A greater part of the air so blown in is sucked into the exhaust pipes together with the exhaust gases, and fed into the regenerator chamber.

What is claimed is:

1. A process for producing glass having a metal oxide coating, which comprises a step of coating the surface of high temperature glass with a heat-decomposable metal compound or its solution, a step of sucking and removing exhaust gases generated in said step from the vicinity of the surface of the glass, and a step of feeding the exhaust gases so removed into a regenerator chamber of a glass melting furnace and then releasing them into the atmosphere.

2. A process for producing a ribbon-like glass having a metal oxide coating, which comprises a step of forming molten glass into a ribbon-like glass and advancing it, a step of spraying a heat-decomposable metal compound or its solution on to the surface of said ribbon-like glass while it is still hot, a step of removing the exhaust gases generated in the spraying step from the vicinity of the surface of the ribbon-like glass, a step of feeding the exhaust gases into a regenerator chamber of a glass melting furnace and releasing them into the atmosphere, and a step of advancing the ribbon-lkie glass having formed a metal oxide coating thereon further within an annealing lehr.

3. A process for producing a ribbon-like glass having a metal oxide coating, which comprises spraying a heat-decomposable metal compound or its solution on the surface of a ribbon-like glass advancing between a molten metal bath tank and an annealing lehr or within the annealing lehr to form a coating of a metal oxide on the surface of the glass, a step of removing exhaust gases generated in said step, a step of feeding the removed exhaust gases into a regenerator chamber of a glass melting furnace, and releasing them into the atmosphere, and a step of advancing the ribbon-like glass having formed thereon a metal oxide coating, further through the annealing lehr.

4. The process of claim 2 wherein the exhaust gases removed are fed into a regenerator chamber on the air sucking side of the glass melting furnace.

5. The process of claim 2 wherein the exhaust gases removed are fed into a regenerator chamber of a glass melting furnace for forming the ribbon-like glass having formed thereon a metal oxide coating.

6. An apparatus for producing glass having a metal oxide coating, comprising means for spraying a heat-decomposable metal compound or its solution onto the surface of glass held at a high temperature, exhausting means for sucking and removing exhaust gases generated as a result of spraying, from the vicinity of the surface of the glass, and a conduit for conducting exhaust gases sucked and removed by the exhaust means into a regenerator chamber of a glass melting furnace.

7. An apparatus for producing a ribbon-like glass having a metal oxide coating, comprising a device for forming molten glass into a ribbon-like glass, means for transferring the formed ribbon-like glass, spray means running or oscillating toward the surface of the ribbon-like glass at a position where the temperature of the ribbon-like glass in transit is high, means for feeding a heat-decomposable metal compound or its solution to the spray means, exhaust means for sucking and removing exhaust gases generated from the sprayed metal compound or its solution, from the vicinity of the surface of the glass, and a conduit for conducting the sucked and removed exhaust gases into a regenerator chamber of a glass melting furnace.

8. An apparatus for producing a ribbon-like glass having a metal oxide coating, comprising a spray device for spraying a heat-decomposable metal compound or its solution onto the surface of a ribbon-like glass advancing between a molten metal bath tank and an annealing lehr or within the annealing lehr, said spray device being adapted to run or oscillate toward the surface of the ribbon-like glass in its widthwise direction, exhaust means for sucking and removing exhaust gases generated from the sprayed metal compound or its solution, from the vicinity of the surface of the ribbon-like glass through a pair of suction openings located on both sides of the running or oscillating path of said spray device, and a conduit for conducting the exhaust gases sucked and removed by the exhaust means into a regenerator chamber of a glass melting furnace.

9. The apparatus of claim 7, wherein an exchanger cooperating with a gas exchanger of the glass melting furnace is provided in the passageway of said conduit so that the exhaust gases are always fed into a regenerator chamber on the air suction side of the glass melting furnace.

* * * * *